(12) United States Patent
Yoshimura et al.

(10) Patent No.: US 7,299,293 B2
(45) Date of Patent: Nov. 20, 2007

(54) DEVICE AND METHOD FOR DATA TRANSFER

(75) Inventors: Tomonari Yoshimura, Kyoto (JP); Kazuo Inui, Itami (JP); Hiroyuki Ideyama, Amagasaki (JP)

(73) Assignee: Minolta Co., Ltd., Osaka-shi, Osaka (JP)

( * ) Notice: Subject to any disclaimer, the term of this patent is extended or adjusted under 35 U.S.C. 154(b) by 705 days.

(21) Appl. No.: 10/406,492

(22) Filed: Apr. 4, 2003

(65) Prior Publication Data

US 2003/0217178 A1 Nov. 20, 2003

(30) Foreign Application Priority Data

Apr. 5, 2002 (JP) ............................. 2002-103855
Feb. 14, 2003 (JP) ............................. 2003-036927

(51) Int. Cl.
  G06F 15/173 (2006.01)
(52) U.S. Cl. ..................................................... 709/232
(58) Field of Classification Search ................. 709/232, 709/223, 230, 238; 714/18
  See application file for complete search history.

(56) References Cited

U.S. PATENT DOCUMENTS 5,216,427 A * 6/1993 Yan et al. .................... 342/352
6,122,293 A * 9/2000 Frodigh et al. ............. 370/473
6,775,705 B2   8/2004 Maeda
2002/0051221 A1  5/2002 Wakabayashi

FOREIGN PATENT DOCUMENTS

| JP | 09-130565 | 5/1997 |
| JP | 11-65963 | 3/1999 |
| JP | 2000-032184 | 1/2000 |
| JP | 2000-207298 | 7/2000 |
| JP | 2001-197152 | 7/2001 |
| JP | 2002-010017 | 1/2002 |

* cited by examiner

Primary Examiner—David Y. Eng
(74) Attorney, Agent, or Firm—Buchanan Ingersoll & Rooney PC

(57) ABSTRACT

A data sending apparatus, on sending data to a receiving apparatus, searches its storage for a transmission method to the receiving apparatus. After sending data to the receiving apparatus, the sending apparatus receives from the receiving apparatus a transmission result including a transmission condition and capabilities of the receiving apparatus. When an error occurs during the data transmission, the sending apparatus reads the communication and processing capabilities of the receiving apparatus from the transmission result, and resends the data by a transmission method in accordance with the receiving apparatus. It then acquires the transmission result and stores the same in the storage.

11 Claims, 15 Drawing Sheets

FIG.11

| AVAILABLE PROTOCOL | | |
|---|---|---|
| G3 FAX | STATE | COMMUNICATION TROUBLE |
| | PHONE NUMBER | XXX-XXX-XXXX |
| | AVAILABLE RESOLUTION | 200 × 100dpi<br>200 × 200dpi |
| | COLOR/MONOCHROME | MONOCHROME BINARY |
| | PAPER SIZE | A4 |
| | AVAILABLE TIME PERIOD | WEEKDAYS:8:00-18:00<br>HOLIDAYS:STOP |
| | | |
| G4 FAX | STATE | OUT OF SERVICE |
| | PHONE NUMBER | XXX-XXX-XXXX |
| | AVAILABLE RESOLUTION | 200 × 200dpi<br>400 × 400dpi |
| | COLOR/MONOCHROME | MONOCHROME BINARY |
| | PAPER SIZE | A4・B4 |
| | AVAILABLE TIME PERIOD | WEEKDAYS:8:00-18:00<br>HOLIDAYS:STOP |
| | | |
| INTERNET FAX | STATE | NORMAL |
| | MAIL ADDRESS | XXX@XXX.XXX.XXX |
| | AVAILABLE RESOLUTION | 200 × 200dpi<br>300 × 300dpi<br>400 × 400dpi |
| | COLOR/MONOCHROME | MONOCHROME BINARY |
| | FILE FORMAT | TIFF(MH) |
| | PAPER SIZE | A4・B4・A3 |
| | AVAILABLE TIME PERIOD | WEEKDAYS:24H<br>HOLIDAYS:24H |
| | | |
| IPP PRINTER | STATE | NORMAL |
| | IP ADDRESS | XXX.XXX.XXX.XXX |
| | AVAILABLE RESOLUTION | 600 × 600dpi |
| | COLOR/MONOCHROME | MONOCHROME BINARY<br>COLOR BINARY<br>COLOR 24 BITS |
| | FILE FORMAT | TIFF・PDF・JPEG・Text |
| | PAPER SIZE | A3・A4・B4・B5(EMPTY) |

FIG.12

ERROR

DESIGNATED PROTOCOL NOT SUPPORTED BY RECEIVING APPARATUS.

CHANGE PROTOCOL TO FIRST PROTOCOL BEFORE RESEND.

FIG.13

| G3 FAX | STATE | COMMUNICATION TROUBLE |
|---|---|---|
| | PHONE NUMBER | XXX-XXX-XXXX |
| | AVAILABLE RESOLUTION | 200 × 100dpi<br>200 × 200dpi |
| | COLOR/MONOCHROME | MONOCHROME BINARY |
| | PAPER SIZE | A4 |
| | AVAILABLE TIME PERIOD | WEEKDAYS:8:00-18:00<br>HOLIDAYS:STOP |

FIG.14

| G4 FAX | STATE | OUT OF SERVICE |
|---|---|---|
| | PHONE NUMBER | XXX-XXX-XXXX |
| | AVAILABLE RESOLUTION | 200 × 200dpi<br>400 × 400dpi |
| | COLOR/MONOCHROME | MONOCHROME BINARY |
| | PAPER SIZE | A4·B4 |
| | AVAILABLE TIME PERIOD | WEEKDAYS:8:00-18:00<br>HOLIDAYS:STOP |

FIG.15

| INTERNET FAX | STATE | NORMAL |
|---|---|---|
| | MAIL ADDRESS | XXX@XXX.XXX.XXX |
| | AVAILABLE RESOLUTION | 200 × 200dpi<br>300 × 300dpi<br>400 × 400dpi |
| | COLOR/MONOCHROME | MONOCHROME BINARY |
| | FILE FORMAT | TIFF(MH) |
| | PAPER SIZE | A4・B4・A3 |
| | AVAILABLE TIME PERIOD | WEEKDAYS:24H<br>HOLIDAYS:24H |

FIG.16

| IPP PRINTER | STATE | NORMAL |
|---|---|---|
| | IP ADDRESS | XXX.XXX.XXX.XXX |
| | AVAILABLE RESOLUTION | 600 × 600dpi |
| | COLOR/MONOCHROME | MONOCHROME BINARY<br>COLOR BINARY<br>COLOR 24 BITS |
| | FILE FORMAT | TIFF・PDF・JPEG・Text |
| | PAPER SIZE | A3・A4・B4・B5(EMPTY) |

FIG.17

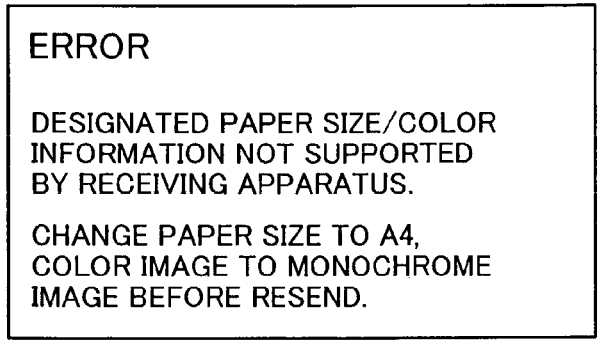

ERROR

DESIGNATED PAPER SIZE/COLOR INFORMATION NOT SUPPORTED BY RECEIVING APPARATUS.

CHANGE PAPER SIZE TO A4, COLOR IMAGE TO MONOCHROME IMAGE BEFORE RESEND.

FIG.18

ERROR

CANNOT SEND COLOR IMAGE.

RESEND MONOCHROME IMAGE.

FIG.19

ERROR

RECEIVING APPARATUS' PAPER FEED TRAY OF DESIGNATED PAPER SIZE IS EMPTY.

CHANGE PAPER SIZE TO A4 OR B4 BEFORE RESEND, OR REDUCE TO A4 SIZE BEFORE PRINT.

FIG.20

ERROR

RECEIVING APPARATUS' PAPER FEED TRAY OF DESIGNATED PAPER SIZE IS EMPTY.

B5 PAPER FEED TRAY IS EMPTY.
SUPPLY B5 PAPER IN PAPER FEED TRAY OR THROUGH MANUAL PAPER FEEDER.

FIG.22

```
ERROR

ERROR AT G3FAX.
RESEND DONE WITH INTERNET FAX
(XXX@XXX.XXX.XXX)
(OR IPP PRINTER (XXX.XXX.XXX.XXX)).
```

FIG.23

```
ERROR

G3FAX INACTIVE AT THIS TIME.
RESEND DONE WITH INTERNET FAX
(XXX@XXX.XXX.XXX)
(OR IPP PRINTER (XXX.XXX.XXX.XXX)).
```

FIG.24

```
ERROR

DESIGNATED PAPER SIZE/RESOLUTION
NOT SUPPORTED BY RECEIVING
APPARATUS.

SELECT INTERNET FAX
(XXX@XXX.XXX.XXX) TO SEND WITH
DESIGNATED PAPER SIZE/RESOLUTION.
```

FIG.25

```
ERROR

CANNOT RECEIVE COLOR IMAGE WITH
INTERNET FAX.

SELECT IPP PRINTER BEFORE RESEND.
```

DEVICE AND METHOD FOR DATA TRANSFER

This application is based on Japanese Patent Applications Nos. 2002-103855 and 2003-036927, the entire content of which is hereby incorporated by reference.

BACKGROUND OF THE INVENTION

1. Field of the Invention

The present invention relates to recording mediums, and more particularly to a recording medium which records a program causing a computer to perform data transfer.

2. Description of the Related Art

In data transfer through a network, an error may occur, in which case data sent from a sending apparatus would not be received by a receiving apparatus.

As a way of dealing with such a situation, Japanese Patent Laying-Open No. 2001-197152 discloses a serving device which senses an error, automatically handles the same, and further notifies of occurrence of the error.

As another way of dealing with the situation, Japanese Patent Laying-Open No. 2000-32184 discloses an image processor which can automatically switch a transmission method upon occurrence of an error to another transmission method for retransmission.

When the server device disclosed in Japanese Patent Laying-Open No. 2001-197152 is employed, however, a sending apparatus would not be able to acquire states and capabilities of a receiving apparatus, and thus, it cannot select an alternative transmission method if any.

When the image processor disclosed in Japanese Patent Laying-Open No. 2000-32184 is employed, again, the sending apparatus cannot confirm the capabilities of the receiving apparatus. The receiving apparatus may not be able to receive data with the switched other transmission method, causing another error to occur.

SUMMARY OF THE INVENTION

Based on the foregoing, an object of the present invention is to provide a recording medium that records a program causing a computer to perform data transfer.

The object of the present invention is accomplished by a recording medium that records a data transfer program causing a computer to execute a data transfer method including the following steps. That is, the recording medium records the data transfer program that causes a computer to perform: a sending step of sending data to a receiving apparatus by a first transmission method; a receiving step of receiving from the receiving apparatus information including a reception result to the effect that the data sent by the first transmission method cannot be processed appropriately and capability of the receiving apparatus; and an outputting step of outputting a second transmission method for replacement of the first transmission method to a prescribed destination based on the information received from the receiving apparatus.

Preferably, the data transfer program causes the computer to perform a resending step of resending the data to the receiving apparatus by the second transmission method.

Still preferably, the data transfer program causes the computer to perform a storing step of storing the information received from the receiving apparatus in a storage device, and a selecting step of selecting, when sending data to the receiving apparatus after receiving the information, the second transmission method based on the information stored in the storage device.

Still preferably, the data transfer program causes the computer to perform a transferring step of transferring the information received from the receiving apparatus to and from another apparatus.

The first and second transmission methods are preferably determined by communication protocols Alternatively, the first and second transmission methods are preferably determined by communication attributes.

Preferably, the second transmission method is transmission to another apparatus other than the receiving apparatus.

According to another aspect of the present invention, a recording medium records a data transfer program causing a computer to execute a data transfer method including: a detecting step of detecting that data is sent from a sender source to the computer by a first transmission method; and a reporting step of reporting to the sender source by a second transmission method replacing the first transmission method when it is determined that the computer cannot process the data sent by the first transmission method appropriately.

The first and second transmission methods are preferably determined by communication protocols.

Alternatively, the first and second transmission methods are preferably determined by communication attributes.

Preferably, the reporting step includes the step of reporting information about a transmission method with which the computer can process the received data.

Still preferably, the information reported in the reporting step is information about a plurality of kinds of transmission methods.

According to a further aspect of the present invention, a recording medium records a communication program causing a computer to execute communication methods including: a sending step of sending data to a receiving apparatus by a first communication method; a receiving step of receiving from the receiving apparatus information about a usable communication method in the receiving apparatus when the receiving apparatus cannot normally receive the data by the first communication method; and a resending step of resending the data by a second communication method different from the first communication method based on the information received from the receiving apparatus.

The first and second communication methods preferably have different communication protocols.

Alternatively, the first and second communication methods preferably have different communication paths.

Still alternatively, the first and second communication methods preferably have different receiving apparatuses as destinations of the data.

According to yet another aspect of the present invention, an information processing apparatus includes: a sending portion sending data to a receiving apparatus by a first communication method; and a receiving portion receiving from the receiving apparatus information about a usable communication method in the receiving apparatus when the receiving apparatus cannot normally receive the data by the first communication method.

According to still another aspect of the present invention, an information processing apparatus includes: a communication portion communicable by a first communication method and a second communication method; and a control portion controlling the communication portion such that it sends information about a communication method of the information processing apparatus to a sender source by the second communication method when it is determined that the information processing apparatus cannot normally perform a reception process on data sent from the sender source by the first communication method.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 11 shows by way of example a transmission result that is reported from receiving apparatus 2 to sending apparatus 1.

FIG. 12 shows an error message display by way of example.

FIG. 13 shows by way of example a transmission result in the case where receiving apparatus 2 is a G3 facsimile.

FIG. 14 shows by way of example a transmission result in the case where receiving apparatus 2 is a G4 facsimile.

FIG. 15 shows by way of example a transmission result in the case where receiving apparatus 2 is an internet facsimile.

FIG. 16 shows by way of example a transmission result in the case where receiving apparatus 2 is an IPP printer.

FIGS. 17-20 show first through fourth specific examples of the error display.

FIGS. 22 and 23 show first and second specific examples of retransmission report display.

FIGS. 24 and 25 show fifth and sixth specific examples of the error display.

DESCRIPTION OF THE PREFERRED EMBODIMENTS

Figure 1:
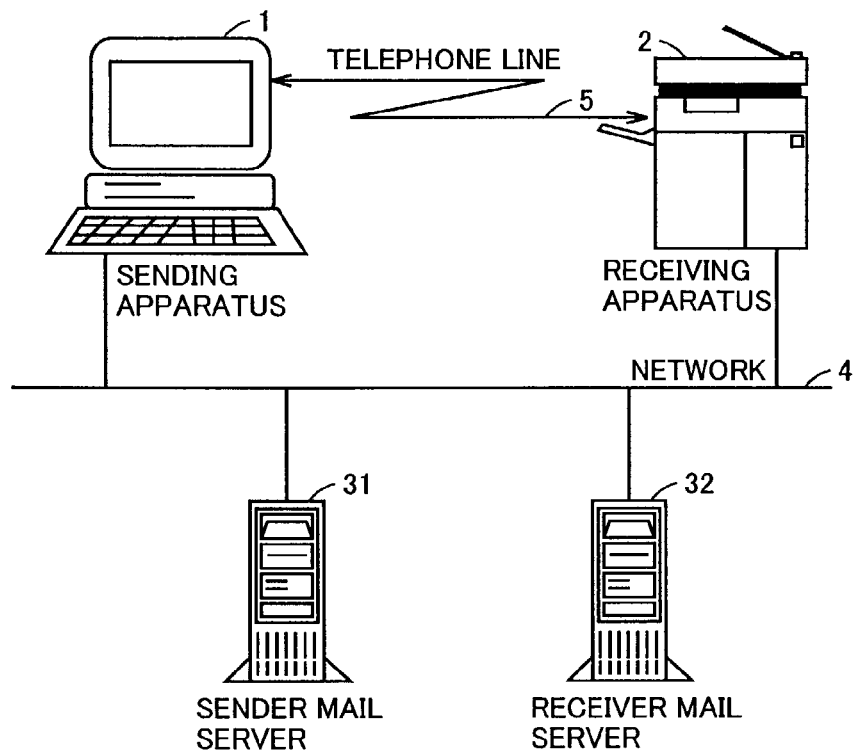
FIG. 1 shows a configuration of a data transfer system according to an embodiment of the present invention.

Hereinafter, an embodiment of the present invention will be described with reference to the drawings. In the following description, the same devices or elements denoted by the same reference characters have the same names and functions, and thus, detailed description thereof will not be repeated.

Referring to FIG. 1, the data transfer system according to an embodiment of the present invention includes a sending apparatus 1, a receiving apparatus 2, a sender mail server 31 and a receiver mail server 32, which are connected through a network 4. Sending apparatus 1 and receiving apparatus 2 are further connected through a telephone line 5.

Sending apparatus 1 and receiving apparatus 2 are provided with functions to send/receive data such as documents and images through network 4 and telephone line 5. In the present embodiment, sending apparatus 1 is described as a personal computer provided with functions to communicate through network 4 and through telephone line 5, and receiving apparatus 2 is described as a compound type apparatus called MFP (Mutli Function Peripheral) provided with functions to communicate through network 4 and through telephone line 5, although they are not limited thereto.

Figure 2:
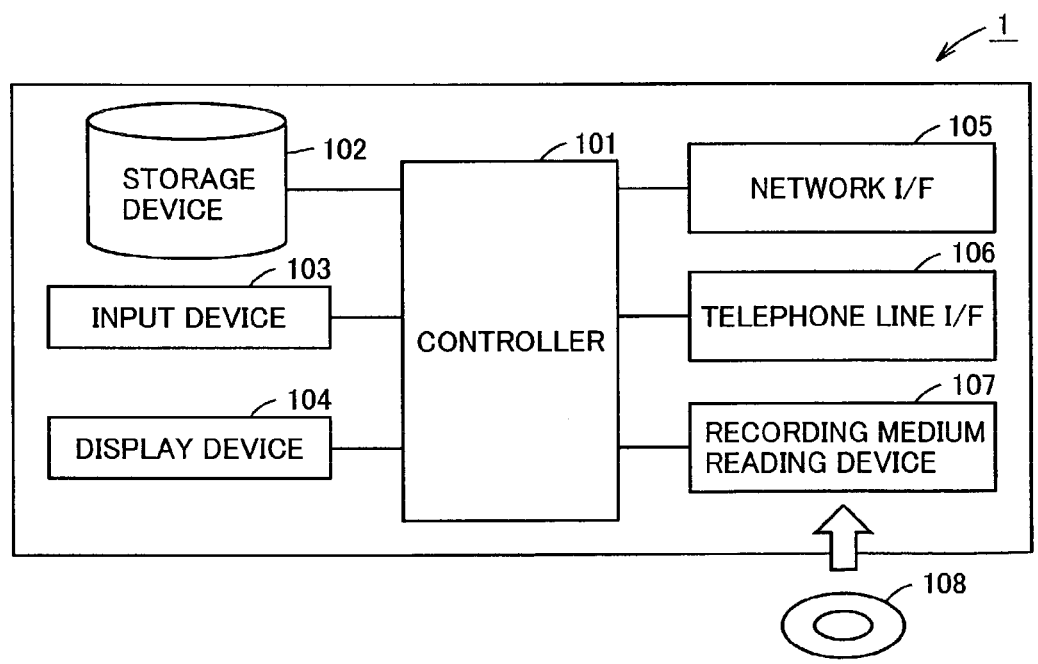
FIG. 2 is a block diagram showing a configuration of a sending apparatus 1 shown in FIG. 1.

Referring to FIG. 2, sending apparatus 1 includes a controller 101 which is formed of a CPU (Central Processing Unit) or the like and performs an entire control of sending apparatus 1, a storage device 102 which stores programs executed by controller 101 and various kinds of information, an input device 103 which is formed of a keyboard, a mouse or the like, a display device 104 which is formed of a display or the like, a network I/F 105 for sending/receiving information through network 4, and a telephone line I/F 106 for sending/receiving information through telephone line 5. Sending apparatus 1 may further include a recording medium reading device 107 for reading a recording medium 108 such as a flexible disk, a CD-ROM (Compact Disc-Read Only Memory) or the like, which reads a program to be executed by controller 101 from recording medium 108.

Shown in FIG. 2 is a configuration of a common personal computer. The configuration of sending apparatus 1 is not limited thereto.

Figure 3:
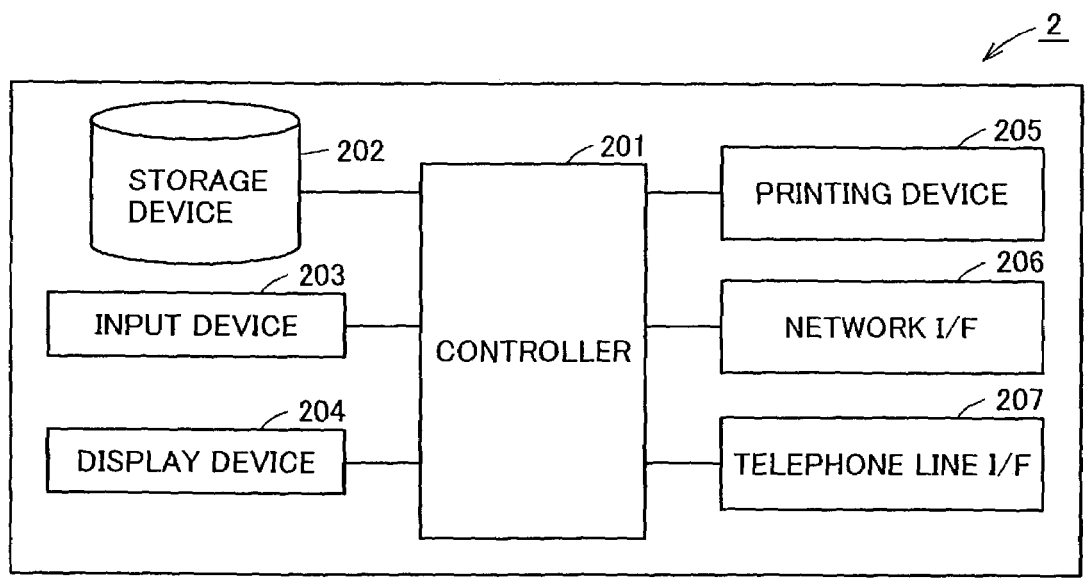
FIG. 3 is a block diagram showing a configuration of a receiving apparatus 2 shown in FIG. 1.

Referring to FIG. 3, receiving apparatus 2 includes a controller 201 which is formed of a CPU or the like and performs an entire control of receiving apparatus 2, a storage device 202 which stores programs executed by controller 201 and various kinds of information, an input device 203 formed of an input button or the like, a display device 204 formed of a display panel or the like, a printing device 205 which performs a printing process, a network I/F 206 for sending/receiving information through network 4, and a telephone line I/F 207 for sending/receiving information through telephone line 5.

The configuration of receiving apparatus 2 shown in FIG. 3 is a configuration of a common MFP, which is merely illustrative and not restrictive at all.

Figure 4:
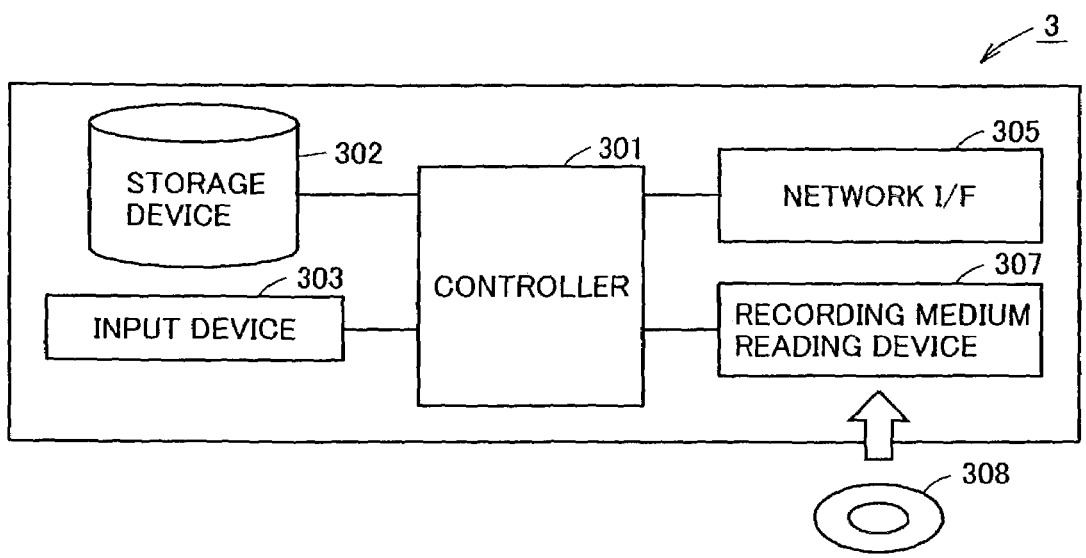
FIG. 4 is a block diagram showing a configuration of a mail server 3 shown in FIG. 1.

Here, sender mail server 31 and receiver mail server 32 are collectively referred to as a mail server 3. FIG. 4 shows a specific example of a configuration of mail server 3.

Referring to FIG. 4, mail server 3 includes a controller 301 which is formed of a CPU or the like and performs an entire control of mail server 3, a storage device 302 which stores programs executed by controller 301 and various kinds of information, an input device 303 formed of a setting button or the like, and a network I/F 305 for sending/receiving information through network 4. Mail server 3 may further include a recording medium reading device 307 reading a recording medium 308 such as a flexible disk, a CD-ROM or the like, which reads a program being executed by controller 301 from recording medium 308.

Mail server 3 is structured with a common computer or the like whose configuration is shown in FIG. 4 by way of example. The configuration of mail server 3 is not limited to that shown in FIG. 4.

Although the case where separate mail servers 3 are provided for the sender side (sender mail server 31) and for the receiver side (receiver mail server 32) as shown in FIG.

1 is described in the following, a configuration where the sender side and the receiver side use one and the same mail server 3 may also be employed.

In the data transfer system including sending apparatus 1 and receiving apparatus 2 described above, data is transferred from sending apparatus 1 to receiving apparatus 2. There are three paths for use in the data transfer. The first transfer path is for transferring data through telephone line 5. The second transfer path is for transferring data directly from sending apparatus 1 to receiving apparatus 2 through network 4. The third transfer path is for transferring data through network 4 by way of sender mail server 31 and receiver mail server 32.

Hereinafter, a data transferring process in the data transfer system of the present embodiment is described.

Firstly, the data transmitting process in sending apparatus 1 is described with reference to a flow chart of FIG. 5. The process illustrated in the flow chart of FIG. 5 is implemented as controller 101 of sending apparatus 1 reads and executes a program stored in storage device 102.

Figure 5:
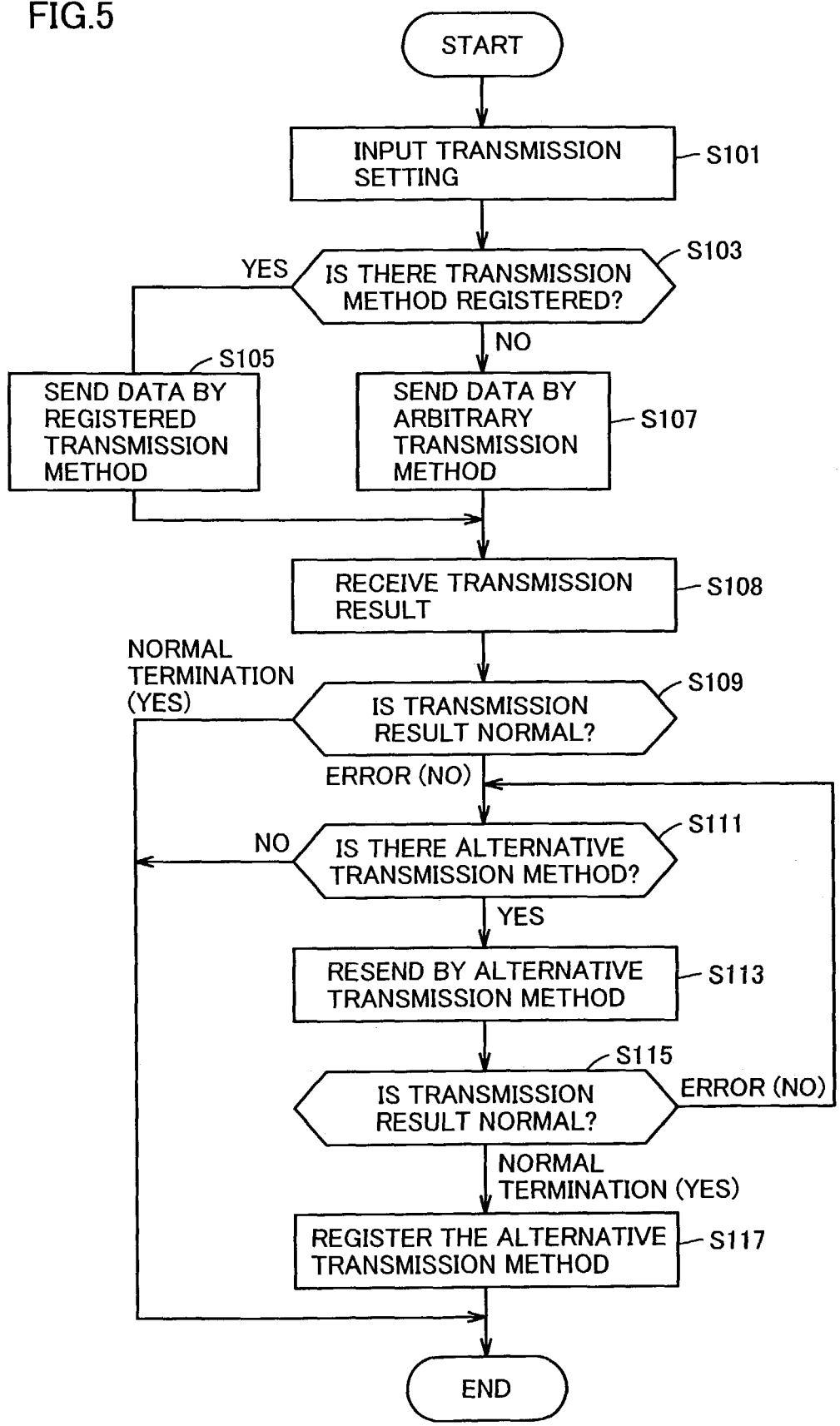
FIG. 5 is a flow chart illustrating a data transmitting process in sending apparatus 1.

Referring to FIG. 5, firstly, data transmission setting is input from input device 103 (S101). Specifically, settings regarding selection of data to be sent, selection of receiving apparatus 2 as a destination of data and others are input in step S101.

Next, storage device 102 is searched to see if a transmission method has been registered therein for the receiving apparatus 2 as the destination input in step S101 (S103). The registration of the transmission method searched in step S103 includes registration of communication capabilities including information on the first through third transfer paths described above, and registration of processing capabilities including information on attributes. The details will be described later giving specific examples.

If the transmission method registered for the relevant receiving apparatus 2 is extracted from storage device 102 in step S103 (YES in S103), then data is sent using the extracted transmission method (S105). If the transmission method registered for the relevant receiving apparatus 2 is not extracted from storage device 102 in step S103, i.e., if the transmission method has not been registered (NO in S103), then data is sent using an arbitrary transmission method designated by a user (S107).

Sending apparatus 1, after sending data to receiving apparatus 2 in either step S105 or step S107, receives a transmission result from receiving apparatus 2 (S108).

When the transmission result received from receiving apparatus 2 in step S108 is one reporting that the data transmission was completed normally (NORMAL TERMINATION in S109), sending apparatus 1 ends the relevant program.

On the contrary, if an error occurs in receiving apparatus 2 upon reception of data, a transmission result is sent from receiving apparatus 2 to sending apparatus 1 by a transmission method that is different from the one used for the data transmission.

When sending apparatus 1 receives the transmission result from receiving apparatus 2 (S108) and when the received transmission result is one reporting that an error occurred in the data transmission (ERROR in S109), and when an alternative transmission method for replacement of the failed transmission method is included in the received transmission result (YES in S111), then the alternative transmission method is read out of the transmission result. The alternative transmission method obtained in step S111 is used to resend data to receiving apparatus 2 (S113). On the other hand, when the transmission result received from receiving apparatus 2 in step S108 does not include an alternative transmission method for replacement of the failed transmission method (NO in S111), then the relevant program is aborted determining that there is no appropriate transmission method from the relevant sending apparatus 1 to receiving apparatus 2. The transmission method of the transmission result from receiving apparatus 2 to sending apparatus 1 will be described later.

The above-described steps S111 and S113 are repeated until a transmission result about the data retransmission in step S113 is received from receiving apparatus 2 and it is confirmed that the data transmission was completed normally (NORMAL TERMINATION in S115).

When the data transmission is completed normally in step S115 (NORMAL TERMINATION in S115), the alternative transmission method (capability of receiving apparatus 2) at that time and the transmission result are registered, and stored in storage device 102 (S117).

The information stored in storage device 102 in step S117 is extracted later for data transmission in step S103, and data is sent in step S105 using the extracted transmission method suitable for the data transmission to receiving apparatus 2.

The data transmitting process of sending apparatus 1 is thus completed.

Now, the data receiving process in receiving apparatus 2 is explained with reference to a flow chart in FIG. 6. The process illustrated in the flow chart of FIG. 6 is implemented as controller 201 of receiving apparatus 2 reads and executes a program stored in storage device 202.

Figure 6:
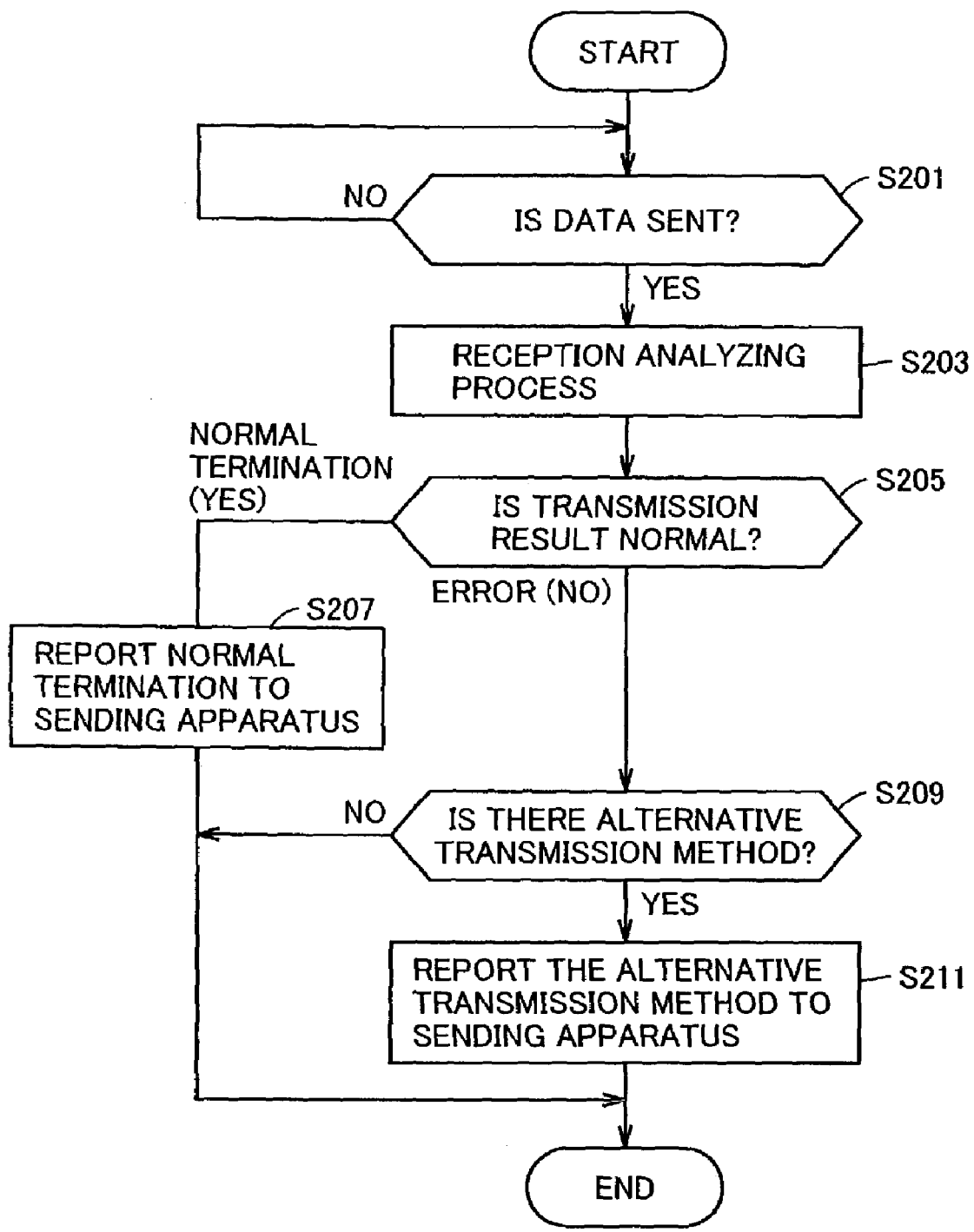
FIG. 6 is a flow chart illustrating a data receiving process in receiving apparatus 2.

Referring to FIG. 6, receiving apparatus 2, when detecting that data was sent out from sending apparatus 1 to the relevant receiving apparatus 2 (YES in S201), analyzes the data transmission method (S203).

As a result of analysis in step S203, if the data transmission method is appropriate and receiving apparatus 2 can receive the data normally (NORMAL TERMINATION in S205), then it sends a transmission result to that effect to sending apparatus 1 (S207).

If the data transmission method is inappropriate and receiving apparatus 2 cannot receive the data (ERROR in S205) and there is an alternative transmission method for replacement of the relevant transmission method (YES in S209), then receiving apparatus 2 sends as a transmission result the report that the data was not received and the alternative transmission method to sending apparatus 1, by a transmission method different from that used by sending apparatus 1 for sending data (S211).

The alternative transmission method is determined according to capabilities of the relevant receiving apparatus 2, which include its communication capabilities and processing capabilities regarding various attributes. In other words, it is determined by a communication protocol or the like of receiving apparatus 2. Thus, in step S211, capabilities of the relevant receiving apparatus 2 may be reported as the alternative transmission method. The capabilities of receiving apparatus 2 to be reported in such a case will be described later giving specific examples.

Further, in step S211, the transmission result may be reported to an apparatus other than sending apparatus 1. Specifically, it may be reported to a personal computer (not shown) of a user having performed data transmission setting, to a network administrator, or to a personal computer (not shown) of a user in charge of receiving apparatus 2. Based on the reported transmission result, an error display reporting the occurrence of error may be displayed on display device 104 of sending apparatus 1, a display device (not shown) of the personal computer of the user having performed data transmission setting or the like. Still further, when retransmission is conducted automatically based on the transmission result, a retransmission report display to that effect may be displayed. The error display and the retransmission report display will be described later giving specific examples. Although the error display and the retransmission report display are described to be displayed on display device 104 of sending apparatus 1 in the following, they may be displayed on a display device (not shown) of the personal computer of the user having performed data transmission setting or the like when the transmission result is reported to an apparatus other than sending apparatus 1 as described above.

The report may be sent through any of the above-described first through third transfer paths. When the third transfer path is being used for reporting, i.e., when the report is sent via sender mail server 31 and receiver mail server 32, header information of the data being sent from sending apparatus 1 preferably includes mail address information of sending apparatus 1, of the user having performed data transmission setting or the like.

The transmission result sent to sending apparatus 1 in step S207 or step S211 is received in step S109 in FIG. 5 as described above, and it is determined whether the data transmission was executed normally or not. The alternative transmission method sent to sending apparatus 1 in step S211 is read in step S111 of FIG. 5, and data is resent to receiving apparatus 2 by the relevant alternative transmission method in step S113.

The data receiving process in receiving apparatus 2 is thus completed. When data is being sent using the third transfer path by way of sender mail server 31 and receiver mail server 32, sender mail server 31 and receiver mail server 32 also perform data transferring processes. The processes in sender mail server 31 and receiver mail server 32 in such a case will now be described.

Figure 7:
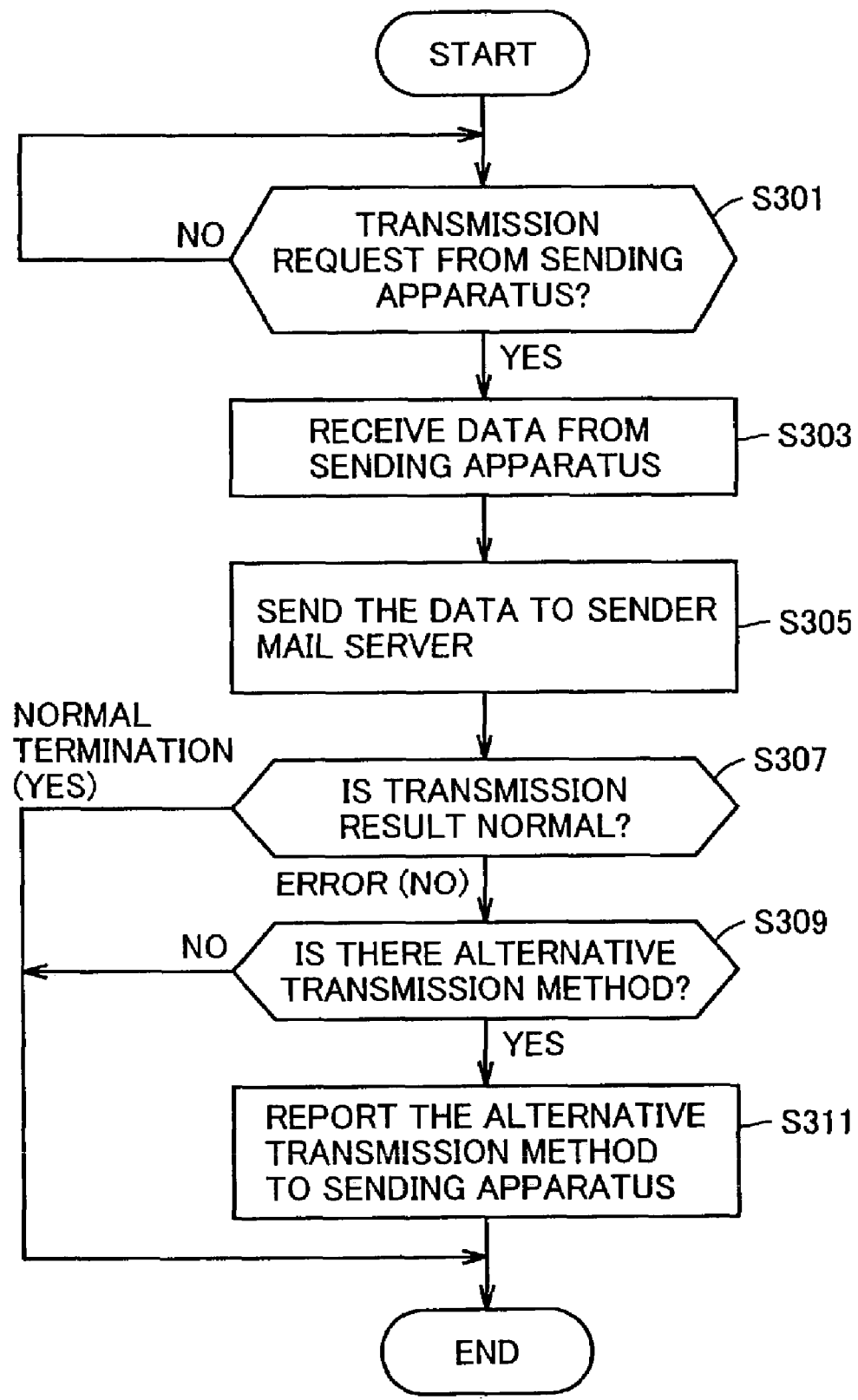
FIG. 7 is a flow chart illustrating a data transferring process in a sender mail server 31.

FIG. 7 is a flow chart illustrating the data transferring process in sender mail server 31. The process illustrated in the flow chart of FIG. 7 is implemented as controller 301 of sender mail server 31 reads and executes a program stored in storage device 302.

Referring to FIG. 7, sender mail server 31, when receiving a data transmission request from sending apparatus 1 through network 4 (YES in S301), receives data from sending apparatus 1 (S303). It then sends the data received in step S303 to receiver mail server 32 (S305).

Sender mail server 31 receives a result of the transmission from receiver mail server 32 to receiving apparatus 2 (S307). The relevant program is completed when the transmission result reports that the data transmission was completed normally (NORMAL TERMINATION in S307).

When the transmission result reports that there occurred an error during the data transmission (ERROR in S307) and when the received transmission result includes an alternative transmission method for replacement of the transmission method using the third transfer path (YES in S309), then sender mail server 31 reads the alternative transmission method out of the transmission result and reports the same to sending apparatus 1 (S311).

The data transferring process in sender mail server 31 is thus completed.

Figure 8:
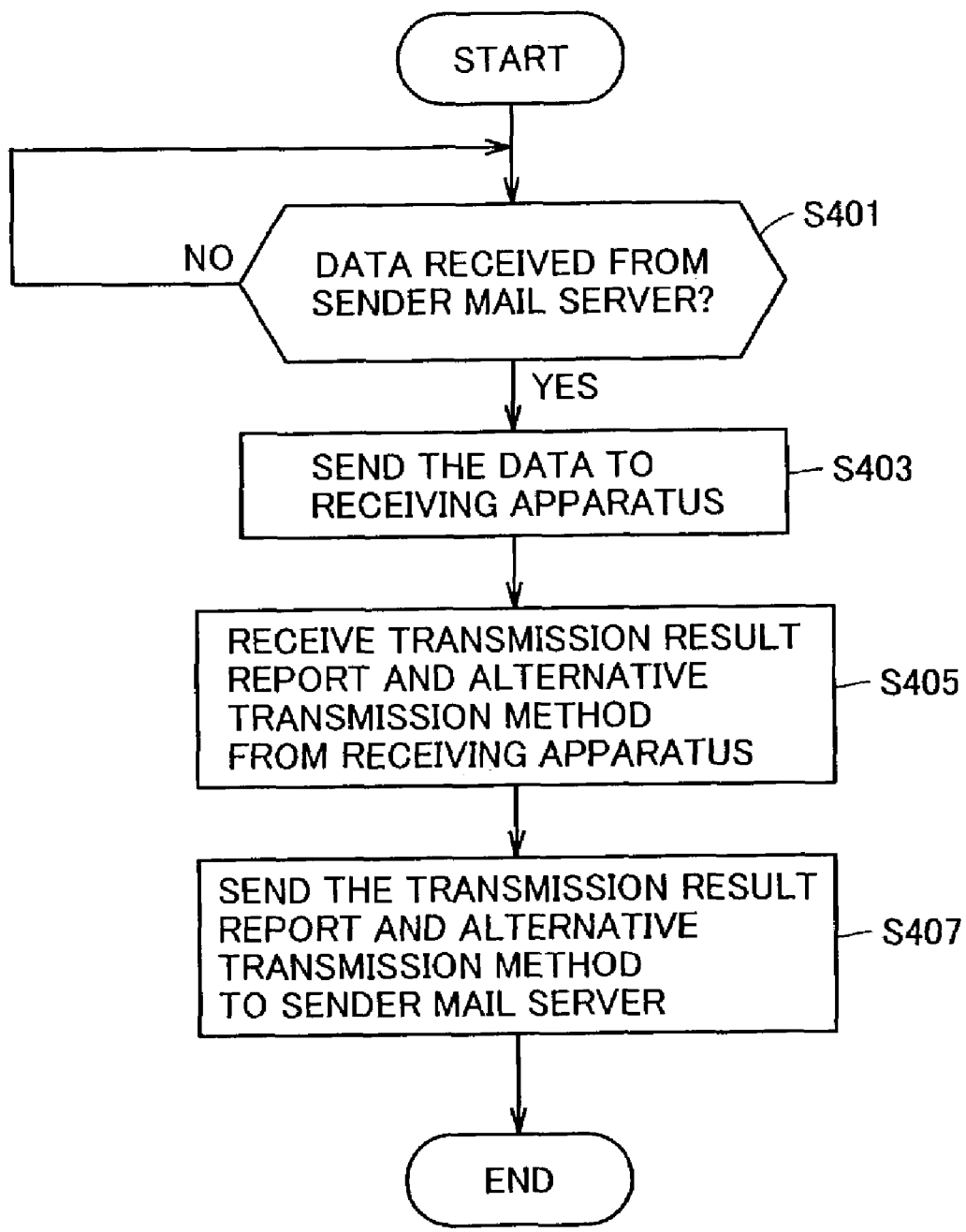
FIG. 8 is a flow chart illustrating a data transferring process in a receiver mail server 32.

FIG. 8 is a flow chart illustrating the data transferring process in receiver mail server 32. The process illustrated in the flow chart of FIG. 8 is implemented as controller 301 of receiver mail server 32 reads and executes a program stored in storage device 302.

Referring to FIG. 8, receiver mail server 32, in receipt of data from sender mail server 31 (YES in S401), sends the data to receiving apparatus 2 (S403).

It then receives a transmission result from receiving apparatus 2 reporting that the data was received normally or that the data transmission was failed (S405). The transmission result reporting the data transmission error may include an alternative transmission method for replacement of the transmission method using the third transfer path.

Receiver mail server 32 sends the transmission result received in step S405 to sender mail server 31 (S407).

The data transferring process in receiver mail server 32 is thus completed.

The present embodiment is characterized in that, as an alternative transmission method, a protocol is changed to switch a data transfer path for retransmission. Processes in sending apparatus 1 and receiving apparatus 2 of the present embodiment are now explained specifically with reference to flow charts in FIGS. 9 and 10.

Figure 9:
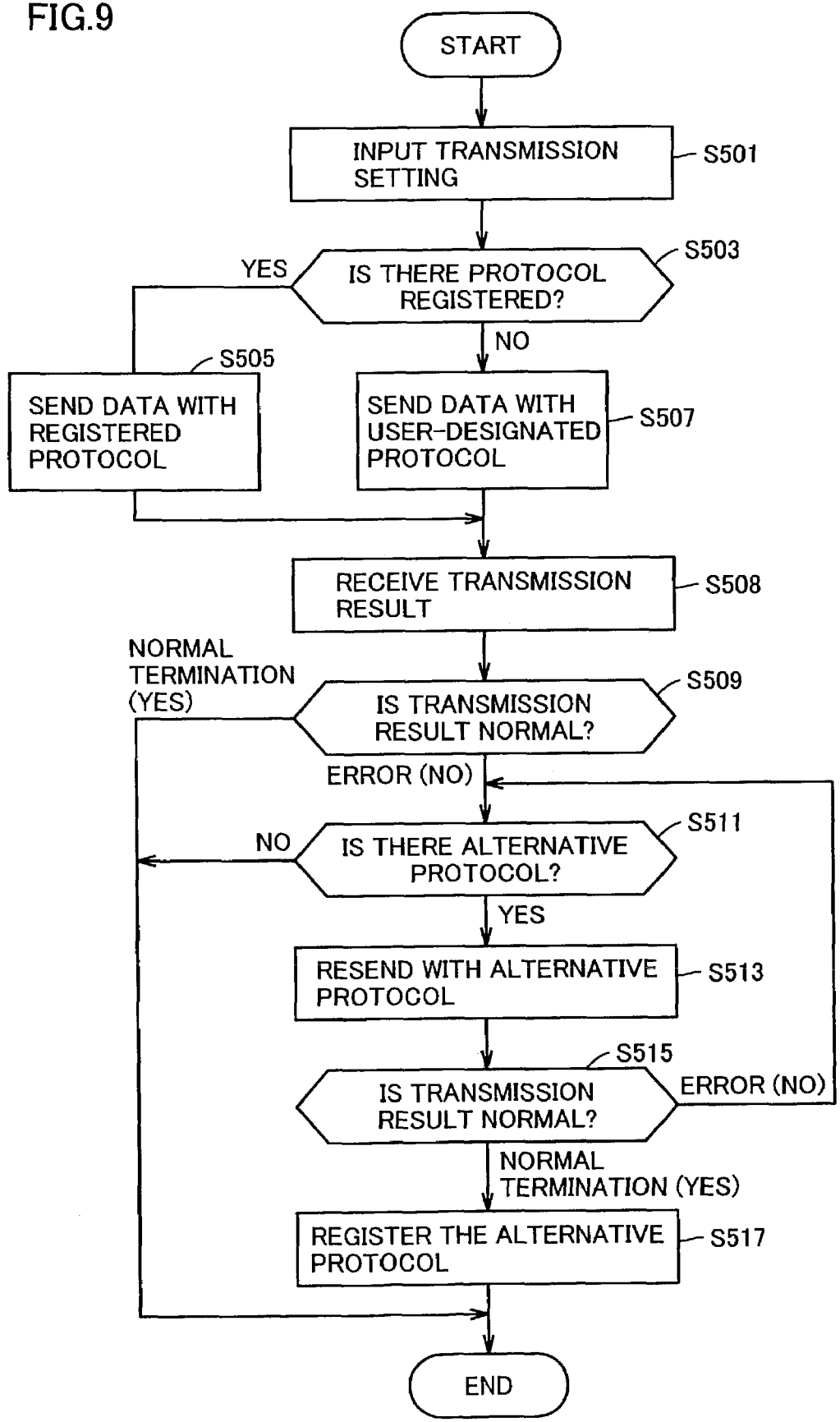
FIG. 9 is a flow chart illustrating a data transmitting process in sending apparatus 1 of the embodiment.

In the present embodiment, referring to the flow chart of FIG. 9, sending apparatus 1 accepts an input of data transmission setting from input device 103 in step S501, as in the above-described step S101.

Next, storage device 102 is searched in step S503 to see if a protocol determining a transmission method has been registered for the destination receiving apparatus 2 input in step S501.

When the protocol registered for the relevant receiving apparatus 2 is extracted from storage device 102 in step S503 (YES in S503), data is sent according to the extracted protocol (S505). If a protocol registered for the receiving apparatus 2 is not extracted from storage device 102 in step S503, i.e., if a protocol determining a transmission method has not been registered therefore (NO in S503), then data is sent according to a protocol designated by a user (S507).

Sending apparatus 1, after sending data to receiving apparatus 2 in step S505 or step S507, receives a transmission result from receiving apparatus 2 in step S508.

When the transmission result received from receiving apparatus 2 in step S508 is one reporting that the data transmission was completed normally (NORMAL TERMINATION in S509), then sending apparatus 1 completes the relevant program.

If an error occurred in receiving apparatus 2 during reception of data, the transmission result is sent from receiving apparatus 2 to sending apparatus 1 according to a protocol that is different from the one used for the data transmission.

When sending apparatus 1 receives the transmission result from receiving apparatus 2 (S508) and when the received transmission result is the one reporting that the data transmission was failed (ERROR in S509), and further when the received transmission result includes an alternative protocol for replacement of the failed protocol (YES in S511), then sending apparatus 1 reads the alternative protocol out of the transmission result. Sending apparatus 1 then resends the data to receiving apparatus 2 according to the alternative protocol obtained in step S511 (S513). When the transmission result received from receiving apparatus 2 in step S508 does not include an alternative protocol for replacement of the failed protocol (NO in S511), then sending apparatus 1 aborts the relevant program considering that there is no protocol determining a transmission method suitable for sending data from the relevant sending apparatus 1 to receiving apparatus 2.

Sending apparatus 1 receives from receiving apparatus 2 a transmission result about the data retransmission in step S513, and repeats steps S511 and S513 until the data transmission is completed normally (NORMAL TERMINATION in S515).

When the data transmission is completed normally in step S515 (NORMAL TERMINATION in S515), sending apparatus 1 registers the alternative protocol at that time and the transmission result, and stores the same in storage device 102 (S517).

The information stored in storage device 102 in step S517 is extracted later in step S503 when data transmission is performed, and the data transmission is executed in step S505 according to the extracted protocol suitable for receiving apparatus 2.

The data transmitting process in sending apparatus 1 of the present embodiment is thus completed.

Now, the data receiving process in receiving apparatus 2 is explained.

Figure 10:
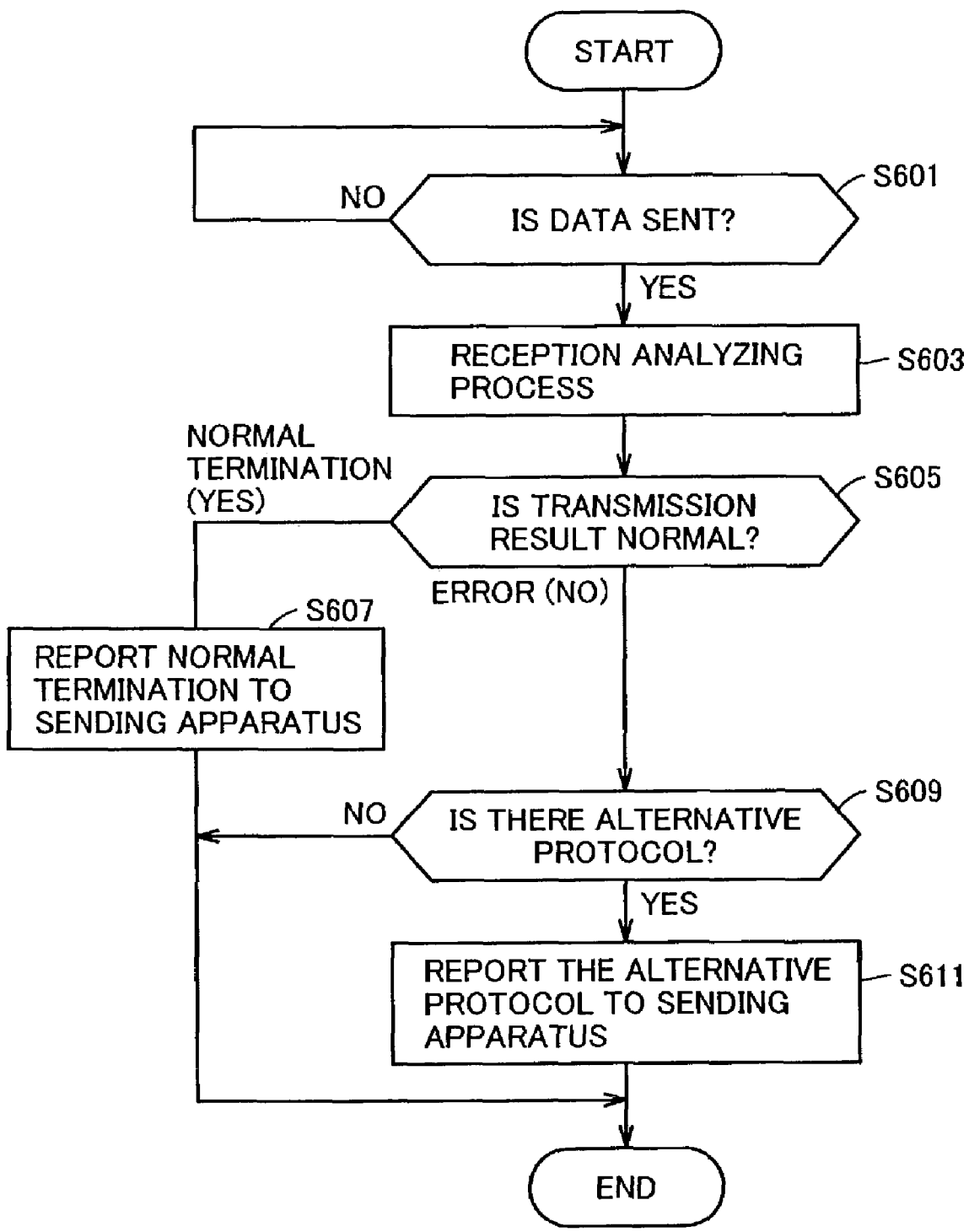
FIG. 10 is a flow chart illustrating a data receiving process in receiving apparatus 2 of the embodiment.

In the present embodiment, referring to the flow chart in FIG. 10, receiving apparatus 2, when detecting that data has been sent from sending apparatus 1 to the relevant receiving apparatus 2 (YES in S601), analyzes the receiving method (S603).

As a result of analysis in step S603, when the protocol determining the data transmission method is an appropriate protocol and thus receiving apparatus 2 can receive data normally (NORMAL TERMINATION in S605), receiving apparatus 2 reports the same to sending apparatus 1 as a transmission result (S607).

When the protocol determining the data transmission method is an inappropriate one and thus receiving apparatus 2 cannot receive data (ERROR in S605) and when there is an alternative protocol for replacement of the relevant protocol (YES in S609), then receiving apparatus 2 sends a report that the data was not received and the alternative protocol to sending apparatus 1 as a transmission result, according to a protocol other than the one with which data was send from sending apparatus 1 (S611).

The data receiving process in receiving apparatus 2 of the present embodiment is thus completed.

As a first specific example of the present embodiment, sending apparatus 1 sends data to receiving apparatus 2 in step S505 or step S507 in FIG. 9, from telephone line I/F 106 through the first transfer path by way of telephone line 5. When an error occurs at this time, receiving apparatus 2 analyzes the receiving condition in step S603 in FIG. 10 and, in step S611, it sends a transmission result to sending apparatus 1 via network I/F 206. Specifically, it reports the fact that the data was not received and a protocol which determines an alternative transmission method using either the second transfer path with which data is transmitted directly through network 4 or the third transfer path with which data is transmitted by way of sender mail server 31 and receiver mail server 32. The relevant report is sent to sending apparatus 1 using a path that is different from the path used for sending data from sending apparatus 1 to receiving apparatus 2 (the first transfer path by way of telephone line 5 in this specific example), which may be the same path as the alternative transmission method, or another path available for transmission at this time.

Here, if there is only one transfer path as the alternative transmission method, use of the relevant path for sending the transmission result to sending apparatus 1 in itself can be regarded as the report of the alternative transmission method. Thus, it is preferable that receiving apparatus 2 sends the transmission result to sending apparatus 1 using the alternative transmission method and that the transmission result includes therein a destination (telephone number when the alternative transmission method corresponds to the first transfer path through telephone line 5, or mail address when the alternative transmission method corresponds to the third transfer path by way of sender mail server 31 and receiver mail server 32) for performing data transmission to receiving apparatus 2 using the relevant alternative transmission method.

When receiving apparatus 2 can receive data through a plurality of paths, receiving apparatus 2 may report to sending apparatus 1 protocols determining the plurality of transfer paths through which it can receive data (in this specific example, both the second transfer path for direct transmission through network 4 and the third transfer path by way of sender mail server 31 and receiver mail server 32) as the alternative transmission methods. In this case, receiving apparatus 2 may report the plurality of transfer paths with priorities assigned thereto.

Further, as the alternative transmission method, receiving apparatus 2 may report to sending apparatus 1, instead of a specific transfer path, a destination for data transmission to receiving apparatus 2 through the relevant transfer path. More specifically, assume that data transmission to receiving apparatus 2 through the first transfer path by way of telephone line 5 is failed due to service interruption of a facsimile function of receiving apparatus 2. In such a case, receiving apparatus 2 may report a transmission result indicating a mail address for receiving the data via an internet facsimile function or an IP address for receiving the data via an IPP print function as the alternative transmission method to sending apparatus 1, using a function other than the facsimile function.

Based on the transmission result received in step S509 in FIG. 9, sending apparatus 1 switches the protocol determining the transmission method to the one determining the alternative transmission method using either the second transfer path for direct transmission through network 4 or the third transfer path by way of sender mail server 31 and receiver mail server 32, and resends data to receiving apparatus 2 in step S513.

Here, sending apparatus 1 may switch the transmission method to the one using the same transfer path as the path through which the report of the alternative transmission method was sent from receiving apparatus 2. Alternatively, when a plurality of transfer paths included in the alternative transmission method reported from receiving apparatus 2 have priorities assigned thereto, sending apparatus 1 may switch the transmission method according to the priorities. Further, when the alternative transmission method reported from receiving apparatus 2 includes a plurality of transfer paths, sending apparatus 1 may employ the prescribed priorities to select and switch to an appropriate transfer path among them.

Sending apparatus 1 stores the transmission result and the protocol determining the transmission method with respect to receiving apparatus 2 in storage device 102. When data transmission to receiving apparatus 2 is performed later, the stored information is extracted, and data is sent according to the protocol corresponding to the second transfer path for direct transmission through network 4 or the third transfer path by way of sender mail server 31 and receiver mail server 32.

As a second specific example of the present embodiment, assume that an error occurs at the time when data is sent from sending apparatus 1 to receiving apparatus 2 through the second transfer path for direct transmission through network 4. In such a case, sending apparatus 1 may receive, as a transmission result from receiving apparatus 2, an alternative protocol determining the transmission method using either the first transfer path through telephone line 5 or the third transfer path by way of sender mail server 31 and receiver mail server 32, according to a protocol other than the protocol corresponding to the second transfer path for direct transmission through network 4 subjected to the error. In this case, again, sending apparatus 1 switches the transmission method, based on the transmission result, from the protocol corresponding to the second transfer path for direct transmission through network 4 to the alternative protocol corresponding to the first transfer path through telephone line 5 or the third transfer path by way of server mail server 31 and receiver mail server 32, and resends data to receiving apparatus 2. Sending apparatus 1 stores the transmission result and the protocol determining the transmission method with respect to receiving apparatus 2 in storage device 102.

FIG. 11 shows a specific example of the transmission result reported from receiving apparatus 2 to sending apparatus 1. It corresponds to the case where receiving apparatus 2, which is an MFP, is provided with a fast facsimile function called "G3 facsimile" for a analog communication line, a fast facsimile function called "G4 facsimile" assuming the use of a digital communication line, an internet facsimile function utilizing an internet line, and an IPP (Internet Printing Protocol) print function using HTTP (Hypertext Transfer Protocol) for transfer of print data.

The transmission result as shown in FIG. 11 is reported from receiving apparatus 2 to sending apparatus 1 when data is sent from sending apparatus 1 to receiving apparatus 2 using the first transfer path (first protocol) through telephone line 5. That is, when sending apparatus 1 sends data to receiving apparatus 2 through the first transfer path by way of telephone line 5, if receiving apparatus 2 cannot receive the data with the G3 facsimile function for analog communication line due to communication trouble occurring in the analog communication line, or with the G4 facsimile function for digital communication line due to service interruption of the relevant function, then receiving apparatus 2 reports the transmission result shown in FIG. 11 to sending apparatus 1 through a transfer path (protocol) different from the first transfer path by way of telephone line 5. The transmission result shown in FIG. 11 indicates that the G3 facsimile function for analog communication line failed to receive data due to communication trouble and that the G4 facsimile function for digital communication line failed to receive data because it was out of service. The transmission result shown in FIG. 11 further indicates that data reception can be done by alternative transmission methods via other paths, with an internet facsimile function utilizing an internet line and an IPP print function using HTTP to transfer print data, by reporting access methods of mail address and IP address or the like as the communicable transfer paths (protocols). At this time, as further shown in FIG. 11, processing capabilities and attributes such as available resolution of the relevant receiving apparatus 2 can be reported along with the transmission result. Further, in the case where data can be received through a plurality of transfer paths as described above, information indicating priorities of the transfer paths may also be reported as the transmission result to sending apparatus 1. Still further, receiving apparatus 2 can report an alternative transmission method to sending apparatus 1 by using the relevant method when sending the transmission result to the effect that the data reception was failed as shown in FIG. 11.

Sending apparatus 1 (or sender mail server 31 when the third transfer path described above is employed) can confirm whether data transmission was terminated normally or encountered an error, by acquiring the transmission result as shown in FIG. 11 by way of example. When the data transmission is failed, sending apparatus 1 can further detect an available transfer path (protocol) being an access method such as a telephone number, a mail address or the like from the transmission result, and automatically switch the transfer path (protocol) to resend data to receiving apparatus 2. Alternatively, it can automatically switch the transfer path to the path through which it received the transmission result reporting the data transmission error, to resend data to receiving apparatus 2. When sending apparatus 1 automatically resends data in these manners, a retransmission report display like "data was resent by switching the protocol for receiving apparatus 2 from the first protocol to the second protocol" can be provided on display device 104 of sending apparatus 1 or the like. Alternatively, the transmission result received from receiving apparatus 2 may be displayed on display device 104 of sending apparatus 1 or printed by a printer (not shown) to report the transmission result and/or the alternative protocol included therein to the user. Sending apparatus 1 may accept a retransmission designation of the relevant data from the user, and may display an error message as shown in FIG. 12 in response to the designation.

Although the case where different protocols correspond to different transfer paths has been described in the present embodiment, the transmission method of the present invention is not limited thereto. It may be configured such that different protocols correspond to the same transfer path or one protocol corresponds to multiple transfer paths.

First Modification

The first modification of the present embodiment is characterized in that, as an alternative transmission method, sending apparatus 1 switches one or more attributes of data for retransmission. The first modification is explained specifically in the following.

In the first modification, sending apparatus 1 sends data designated as paper size "A3", resolution "200×200 dpi" and color information "color binary" by G3 facsimile standards, for example, to receiving apparatus 2 in step S105 or step S107 in FIG. 5.

At this time, the G3 facsimile function of receiving apparatus 2 has capabilities and others as in the transmission result shown in FIG. 11 by way of example, which do not support the paper size nor the color information described above. It means that receiving apparatus 2 cannot receive the relevant data normally with the G3 facsimile function. Thus, receiving apparatus 2 reports to sending apparatus 1 in step S211 in FIG. 6 the transmission result as shown in FIG. 11, using attributes other than those (paper size "A3", color information "color binary") which sending apparatus 1 sent to receiving apparatus 2. More specifically, the fact that the data reception was failed and the attributes supported by receiving apparatus 2 as alternative transmission method as shown in FIG. 11 are reported as the transmission result to sending apparatus 1. If receiving apparatus 2 is an MFP, it may send only the G3 facsimile information as shown in FIG. 13 as the transmission result.

Alternatively, if receiving apparatus 2 is a so-called G3 facsimile machine provided only with the G3 facsimile function whose capabilities and others are shown in FIG. 11 as a specific example of the transmission result, again, it cannot receive the above-described data normally. Thus, it reports the transmission result as shown in FIG. 13 to sending apparatus 1 in step S211 in FIG. 6.

The transmission method used here for sending the report to sending apparatus 1 has an attribute different from that sent from sending apparatus 1 to receiving apparatus 2, as in the present embodiment, which attribute may be the same as that of the alternative transmission method or another attribute available for data transmission at that time. Further, when receiving apparatus 2 can receive data with a plurality of attributes, it may report the plurality of data-receivable attributes (in this specific example, both attributes of resolution "200×100 dpi" and color information "monochrome binary") to sending apparatus 1 as the alternative transmission methods, as shown in FIG. 11 or 13. In such a case, receiving apparatus 2 may send the plurality of attributes with priorities assigned thereto.

When sending apparatus 1 receives the transmission result as shown in FIG. 11 or 13 in step S109 of FIG. 5, it reads processing capabilities and attributes supported by the G3 facsimile function of receiving apparatus 2 from the transmission result in step S111 to convert the data to be sent. More specifically, it converts the paper size and color information designated with respect to the data to paper size "A4" and color information "monochrome binary" supported by receiving apparatus 2. It then resends the data converted to conform to the processing capabilities and attributes supported by receiving apparatus 2, to receiving apparatus 2 in step S113.

Similarly, in the case where receiving apparatus 2 receives G4 facsimile data, internet facsimile data or IPP print data, when it cannot support the data sent from sending apparatus 1 with the relevant function, then receiving apparatus 2 reports the transmission result as shown in FIG. 11 by way of example to sending apparatus 1 in step S211 in FIG. 6.

If receiving apparatus 2 is an MFP, it may report only the relevant transmission protocol information, as shown in FIGS. 13-16.

Alternatively, in the case where receiving apparatus 2 is a so-called G4 facsimile machine provided only with the G4 facsimile function whose capabilities and others are shown in FIG. 11 as a specific example of the transmission result, when data not supported by the relevant function is sent from sending apparatus 1, it reports to sending apparatus 1 the transmission result as shown in FIG. 14 by way of example in step S211 of FIG. 6. Further, in the case where receiving apparatus 2 is an internet facsimile machine provided only with the internet facsimile function whose capabilities and others are shown in FIG. 11 as a specific example of the transmission result, when data not supported by the relevant function is sent from sending apparatus 1, it reports the transmission result as shown in FIG. 15 by way of example to sending apparatus 1 in step S211 of FIG. 6. Still further, in the case where receiving apparatus 2 is an IPP printer provided only with the IPP print function whose capabilities and others are shown in FIG. 11 as a specific example of the transmission result, when data not supported by the relevant function is sent from sending apparatus 1, it reports the transmission result as shown in FIG. 16 by way of example to sending apparatus 1 in step S211 of FIG. 6.

The attributes and processing capabilities of receiving apparatus 2 may include, as shown in a specific example of the transmission result in FIG. 11, data color information (color/monochrome), file format, paper feed tray condition (empty) and available time period, or they may include other information. When a transmission result is obtained indicating that these attributes and/or processing capabilities are not supported by receiving apparatus 2, color conversion, file format conversion, paper size conversion and/or others may be performed as an alternative transmission method for retransmission of the data.

Step S111 in FIG. 5 where data is converted to an attribute corresponding to an alternative transmission method may be replaced with a step of providing an error display on display device 104 of sending apparatus 1 or the like based on the transmission result to output a data attribute as the alternative transmission method, in which case an input of the data conversion as described above may be accepted from a user. FIG. 17 shows a first specific example of the error display, which is displayed on display device 104 of sending apparatus 1 or the like when the paper size or color information of the data transmitted from sending apparatus 1 is not supported by receiving apparatus 2. More specifically, this error display is displayed on display device 104 of sending apparatus 1 or the like when sending apparatus 1 sends data of paper size "B4" or color information "color binary" to receiving apparatus 2 having the G3 facsimile function as shown in FIG. 11 or 13, for example.

The alternative transmission method may be output in step S111 to any of a personal computer (not shown) owned by a user having performed data transmission setting, a network administrator, and a personal computer (not shown) owned by a user in charge of receiving apparatus 2.

FIG. 18 shows a second specific example of the error display. This error display is displayed on display device 104 of sending apparatus 1 or the like in the case where data transmitted from sending apparatus 1 has data color information not supported by receiving apparatus 2. More specifically, it is displayed on display device 104 of sending apparatus 1 or the like when sending apparatus 1 sends color image data to receiving apparatus 2 provided with the G4 facsimile function which corresponds only to monochrome binary as shown in FIG. 11 or 14.

FIG. 19 shows a third specific example of the error display. This error display is displayed on display device 104 of sending apparatus 1 or the like in the case where the paper feed tray of receiving apparatus 2 corresponding to the paper size designated to the data transmitted from sending apparatus 1 is empty. More specifically, it is displayed on display device 104 of sending apparatus 1 or the like when sending apparatus 1 sends data of paper size "A3" to receiving apparatus 2 provided with the internet facsimile function as shown in FIG. 11 or 15 and when receiving apparatus 2 runs out of the A3 size paper.

FIG. 20 shows a fourth specific example of the error display. This error display is displayed on display device 204 of receiving apparatus 2 or the like in the case where the paper feed tray of receiving apparatus 2 corresponding to the paper size designated to the data transmitted from sending apparatus 1 is empty. More specifically, it is displayed on display device 204 of receiving apparatus 2 or the like when sending apparatus 1 sends data of paper size "B5" to receiving apparatus 2 provided with the IPP print function as shown in FIG. 11 or 16 and when receiving apparatus 2 runs out of the B5 size paper.

When a transmission result is received indicating that the available time period is not supported, it is possible as an alternative transmission method that the relevant data is temporarily stored in storage device 102 and resent during the available time period.

Second Modification

The second modification of the present embodiment is characterized in that, as an alternative transmission method, receiving apparatus 2 is switched for resending data. The second modification is explained specifically in the following.

Figure 21:
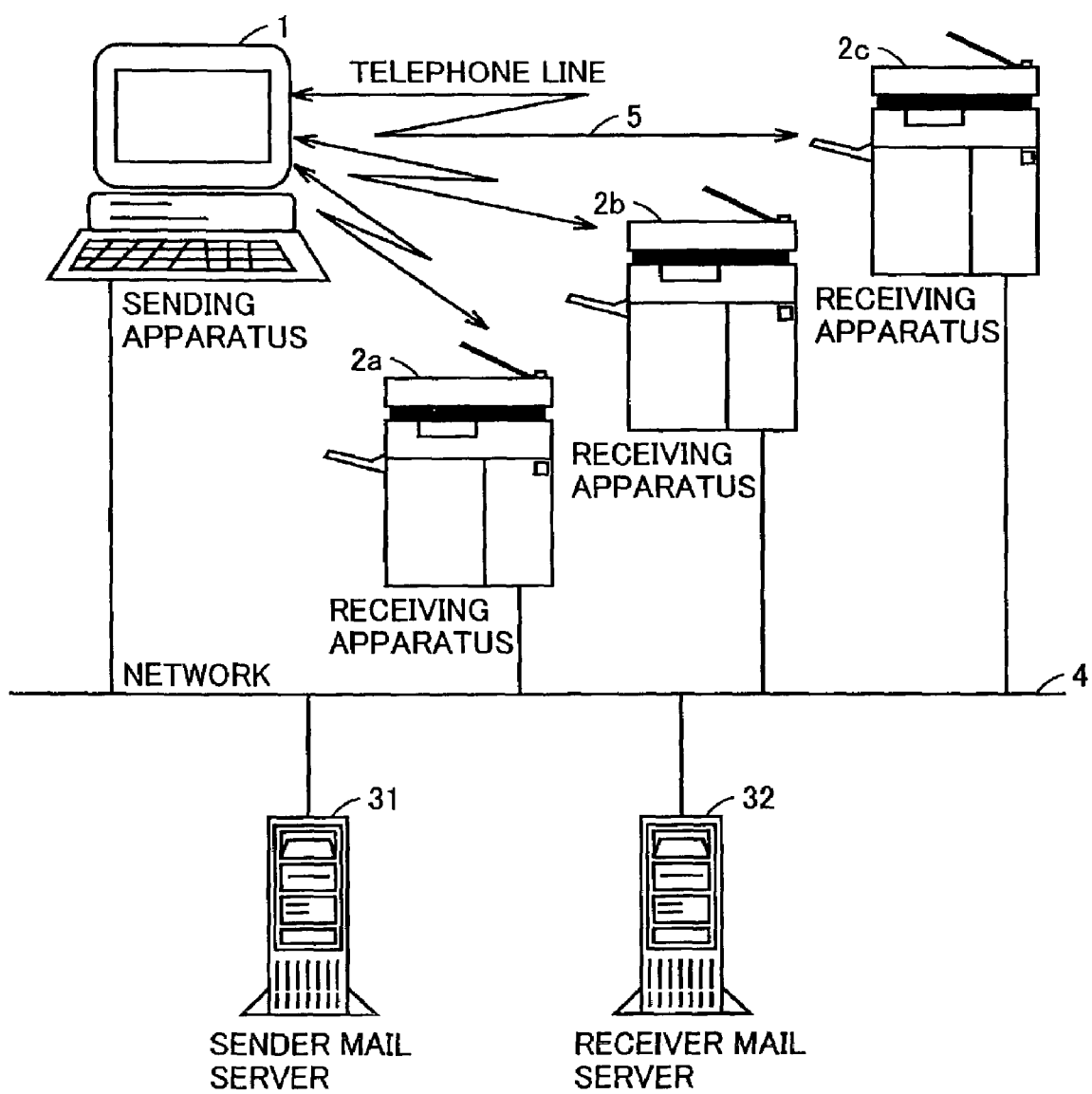
FIG. 21 shows a configuration of a data transfer system according to a second modification of the embodiment.

FIG. 21 shows a configuration of the data transfer system according to the second modification.

Referring to FIG. 21, the data transfer system of the second modification includes a plurality of receiving apparatuses 2a-2c instead of receiving apparatus 2 included in the data transfer system of the present embodiment shown in FIG. 1. Although sending apparatus 1 and receiving apparatuses 2a-2c are connected through telephone line 5, all the receiving apparatuses 2a-2c are not necessarily connected to sending apparatus 1 through telephone line 5, depending on communicable means of respective receiving apparatuses 2a-2c.

Referring to FIG. 21, in the second modification, sending apparatus 1 sends data designated as paper size "A3", resolution "200×200 dpi", color information "color image", to receiving apparatus 2a in step S105 or step S107 in FIG. 5.

At this time, when receiving apparatus 2a is the G3 facsimile machine whose capabilities and others are shown in FIGS. 11 and 13 as the transmission result, the above-described paper size and color information are not supported. Thus, receiving apparatus 2a cannot receive the relevant data normally, and reports the transmission result shown in FIG. 11 to sending apparatus 1 in step S211 of FIG. 6. Here, the report to sending apparatus 1 may be carried out by reporting the data attribute or protocol acceptable to the relevant receiving apparatus 2a as an alternative transmission method, using a protocol or attribute different from the transmission method used for the data transmission, as described above. Alternatively, as the alternative transmission methods, protocols or attributes for sending data to one or both of receiving apparatuses 2b, 2c other than receiving apparatus 2a may be reported to sending apparatus 1.

Sending apparatus 1 having received the transmission result as shown in FIG. 11 in step S109 in FIG. 5 can resend the data to other receiving apparatus 2b, 2c in step S111. That is, when sending apparatus 1 receives as the alternative transmission methods the transmission result indicating protocols or attributes for sending data to other receiving apparatuses 2b, 2c different from receiving apparatus 2a as shown in FIG. 11, then sending apparatus 1 can resend the data to the other receiving apparatus 2b, 2c. In the case where receiving apparatus 2b is an internet facsimile and sending apparatus 1 prestores in storage device 102 the protocol and attributes for sending data to receiving apparatus 2b as shown in FIG. 15, then sending apparatus 1 can resend the data to receiving apparatus 2b supporting the above-described paper size and resolution of the send data in step S111.

When sending apparatus 1 automatically switches receiving apparatus 2 in this manner, a retransmission report screen may be displayed on display device 104 of sending apparatus 1 or the like. FIG. 22 shows a first specific example of the retransmission report display.

In the case where receiving apparatus 2a being the G3 facsimile has an attribute of available time period not corresponding to the data transmission from sending apparatus 1, sending apparatus 1 receives from receiving apparatus 2a in step S109 the transmission result as shown in FIG. 11 indicating protocols or attributes for sending data to receiving apparatuses 2b, 2c other than receiving apparatus 2a as the alternative transmission methods. Based on the received result, in step S111, sending apparatus 1 can resend the data to the other receiving apparatus 2b, 2c corresponding to the relevant attribute of available time period. A retransmission report as shown in FIG. 23 is displayed on display device 104 of sending apparatus 1 or the like. FIG. 23 shows a second specific example of the retransmission report display.

In the case where the attributes of paper size and resolution of receiving apparatus 2a do not correspond to the attributes of data sent from sending apparatus 1, sending apparatus 1 receives the transmission result as shown in FIG. 11 indicating protocols or attributes for sending data to receiving apparatuses 2b, 2c other than receiving apparatus 2a as the alternative transmission methods, from receiving apparatus 2a in step S109. Based on the received result, sending apparatus 1 can display an error display shown in FIG. 24 on display device 104 or the like, and accept an input designating data retransmission to other receiving apparatus 2b, 2c corresponding to the attributes of relevant paper size and resolution. FIG. 24 shows a fifth specific example of the error display.

In the case where receiving apparatus 2a is an internet facsimile whose capabilities and others are shown in FIG. 15 as the transmission result and when data sent from sending apparatus 1 has an attribute not corresponding to the attribute of color of receiving apparatus 2a, then sending apparatus 1 receives from receiving apparatus 2a the transmission result as shown in FIG. 11 indicating protocols or attributes for sending data to receiving apparatuses 2b, 2c other than receiving apparatus 2a as the alternative transmission methods. Based on the received result, sending apparatus 1 can display an error display shown in FIG. 25 on display device 104 or the like, and accept an input designating data retransmission to the other receiving apparatus 2b or 2c corresponding to the relevant color attribute in step S111. FIG. 25 shows a sixth specific example of the error display.

Third Modification

The third modification of the present embodiment is characterized in that the transmission method registered by sending apparatus 1 as the transmission method for receiving apparatus 2 in step S117 of FIG. 5, is shared by sending apparatuses 1a-1c. The third modification is explained specifically in the following.

Figure 26:
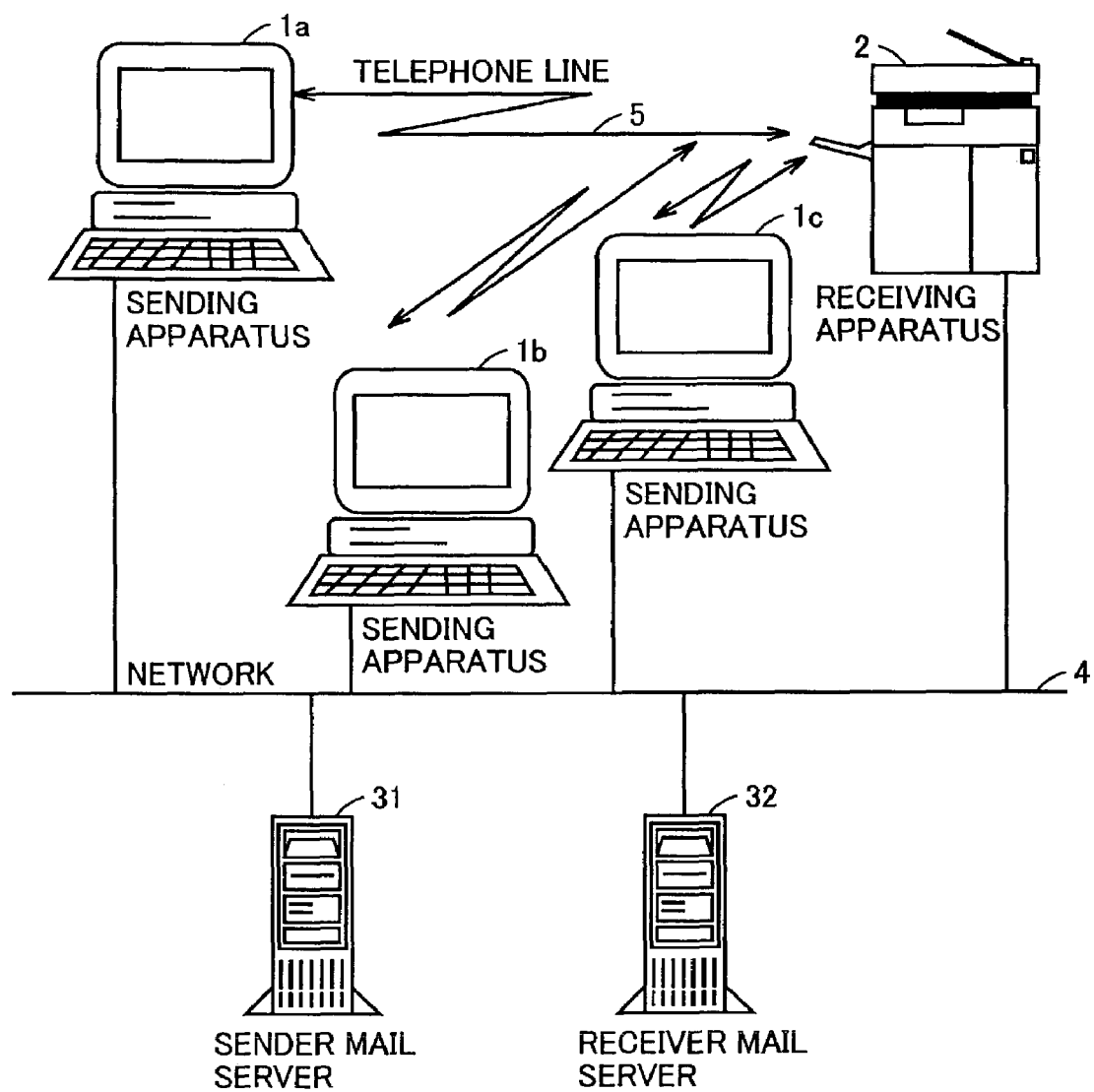
FIG. 26 shows a configuration of a data transfer system according to a third modification of the embodiment.

FIG. 26 shows a configuration of a data transfer system according to the third modification.

Referring to FIG. 26, the data transfer system of the third modification includes a plurality of sending apparatuses 1a-1c instead of sending apparatus 1 included in the data transfer system of the present embodiment shown in FIG. 1. Sending apparatuses 1a-1c and receiving apparatus 2 are communicable through telephone line 5 and network 4.

Referring to FIG. 26, in the third modification, when sending apparatus 1a is to send data designated as paper size "A3", color information "color binary" to receiving apparatus 2, it searches storage device 102 for registration of previous transmission result and transmission method with respect to receiving apparatus 2 in step S103.

If such registration does not exist in storage device 102 of sending apparatus 1a, sending apparatus 1a searches storage devices of other sending apparatuses 1b and 1c via network I/F 105 through network 4.

As a result, if there is such registration in other sending apparatus 1b or 1c, it can read the registration of previous transmission result and transmission method for receiving apparatus 2, or it can receive the registered information sent from other sending apparatus 1b or 1c. More specifically, in the case where receiving apparatus 2 is the G3 facsimile whose capabilities and others are shown in FIG. 13 as the transmission result, sending apparatus 1a obtains information read (or sent) from other sending apparatus 1b or 1c that the above-described paper size and color information are not supported. Thus, it converts the data to paper size "A4", color information "monochrome binary" to conform to the attributes supported by receiving apparatus 2, and then sends the converted data to receiving apparatus 2 in step S105.

Although the method of resending data by changing a data attribute based on a transmission result has been described in the third modification, data can of course be resent by changing a communication path (protocol) based on the transmission result, as in the present embodiment.

In the data transfer systems of the present embodiment and the first through third modifications thereof, the above-described processes are carried out to allow a sending apparatus to acquire state and capabilities of a receiving apparatus and to switch a transmission method. This can reduce errors, and thus, efficient and reliable data transfer becomes possible.

Further, since information of transmission results acquired are accumulated, in a later data transfer to the relevant receiving apparatus, a transmission method highly likely to succeed can be selected from among the accumulated transmission results for use in the data transmission. Thus, the probability of occurrence of an error can be reduced, and efficient and reliable data transfer is ensured.

Still further, the data transfer method employed by the sending apparatus, the data receiving method employed by the receiving apparatus, and the data transfer method employed by the mail server of any of the data transfer systems described above, can be provided as programs. Each program may be provided as a program product that is recorded on any computer readable recording medium such as a flexible disk, CD-ROM, ROM, RAM or memory card attached to a computer, or a hard disk built in the computer. The program may also be provided by downloading through a network. The program product provided is installed in a hard disk, and read out to a RAM for execution. The program product may include the program itself and the recording medium recorded with the program.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A recording medium recording a data transfer program causing a computer to execute a data transfer method comprising the steps of:

sending data to a receiving apparatus by a first transmission method;

receiving from said receiving apparatus information including a reception result indicating that said data sent by said first transmission method cannot be processed appropriately and including a data receiving capability of said receiving apparatus;

resending said data to said receiving apparatus by said second transmission method; and outputting to a prescribed destination a second transmission method for replacement of said first transmission method based on said information received from said receiving apparatus.

2. The recording medium according to claim 1, recording the data transfer program causing the computer to execute the data transfer method further comprising the steps of:

storing said information received from said receiving apparatus to a storage device; and selecting, upon sending data to said receiving apparatus after receiving said information, said second transmission method based on said information stored in said storage device.

3. The recording medium according to claim 1, recording the data transfer program causing the computer to execute the data transfer method further comprising the step of:

transferring said information received from said receiving apparatus to and from another apparatus.

4. The recording medium according to claim 1, wherein said first and second transmission methods are determined by communication protocols.

5. The recording medium according to claim 1, wherein said first and second transmission methods are determined by communication attributes.

6. The recording medium according to claim 1, wherein said second transmission method is transmission to another apparatus other than said receiving apparatus.

7. A recording medium recording a communication program causing a computer to execute communication methods comprising the steps of:

sending data to a receiving apparatus by a first communication method;

receiving from said receiving apparatus information about a usable communication method in said receiving apparatus when said receiving apparatus cannot normally receive said data by said first communication method; and resending said data by a second communication method different from said first communication method based on the information received from said receiving apparatus.

8. The recording medium according to claim 7, wherein said first and second communication methods have different communication protocols.

9. The recording medium according to claim 7, wherein said first and second communication methods have different communication paths.

10. The recording medium according to claim 7, wherein said first and second communication methods have different receiving apparatuses as destinations of said data.

11. An information processing apparatus, comprising:

a sending portion sending data to a receiving apparatus by a first communication method; and a receiving portion receiving from said receiving apparatus information about a usable communication method in said receiving apparatus when said receiving apparatus cannot normally receive said data by said first communication method, wherein said sending portion resends said data by the usable communication method of said receiving apparatus.

* * * * *